(12) United States Patent
Liu et al.

(10) Patent No.: US 10,819,763 B2
(45) Date of Patent: Oct. 27, 2020

(54) APPARATUS AND METHOD OF VIDEO STREAMING

(71) Applicant: AT&T INTELLECTUAL PROPERTY I, L.P., Atlanta, GA (US)

(72) Inventors: Zhengye Liu, Pleasanton, CA (US); Zuxian Guo, Dublin, CA (US); Dhruv Gupta, San Ramon, CA (US); Xiaojun Tang, Milpitas, CA (US); Jin Wang, Fremont, CA (US); Weihua Ye, Bartlett, IL (US); Yongdong Zhao, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 191 days.

(21) Appl. No.: 15/475,682

(22) Filed: Mar. 31, 2017

(65) Prior Publication Data

US 2018/0288773 A1 Oct. 4, 2018

(51) Int. Cl.
*H04L 29/06* (2006.01)
*H04L 12/825* (2013.01)
(Continued)

(52) U.S. Cl.
CPC ........ *H04L 65/601* (2013.01); *H04L 47/2416* (2013.01); *H04L 47/26* (2013.01);
(Continued)

(58) Field of Classification Search
CPC .... H04L 65/601; H04W 24/08; H04W 28/14; H04W 72/0486; H04W 88/08
See application file for complete search history.

(56) References Cited

U.S. PATENT DOCUMENTS 8,918,535 B2   12/2014   Xu et al.
8,930,562 B2   1/2015   Chen et al.
(Continued)

FOREIGN PATENT DOCUMENTS

AU   2013288859 B2   5/2016
CA   2611653 A1   5/2008
(Continued)

OTHER PUBLICATIONS

Birke, Robert et al., "Architecture of a networkaware P2PTV application: the NAPAWINE approach", IEEE Communications Magazine 49.6, 2011, 154-163.
(Continued)

*Primary Examiner* — Andrew Lai
*Assistant Examiner* — M Mostazir Rahman
(74) *Attorney, Agent, or Firm* — Guntin & Gust, PLC; Mark Wilinski

(57) ABSTRACT

Aspects of the subject disclosure may include, for example, a system that provides for obtaining, by a server comprising a processor, network parameter data from an eNodeB of a wireless network. The server can determine a predicted bandwidth for a group of end user devices in a coverage area of the eNodeB according to the network parameter data. The server can receive, from an end user device of the group of end user devices, a request for the predicted bandwidth. The server can provide the predicted bandwidth to the end user device. The providing of the predicted bandwidth enables the end user device to provide a video chunk request to a content server that is based on a selected chunk delivery schedule and facilitates streaming of video content to the end user device from the content server. Other embodiments are disclosed.

20 Claims, 5 Drawing Sheets

(51) Int. Cl.
  *H04W 28/14*  (2009.01)
  *H04L 12/853* (2013.01)
  *H04L 12/835* (2013.01)

(52) U.S. Cl.
  CPC .............. *H04L 47/30* (2013.01); *H04L 65/80* (2013.01); *H04W 28/14* (2013.01)

(56) References Cited

U.S. PATENT DOCUMENTS

| | | | |
|---|---|---|---|
| 9,043,467 | B2 | 5/2015 | Kovvali et al. |
| 9,246,842 | B2 | 1/2016 | Papathanassiou et al. |
| 9,257,092 | B2 | 2/2016 | Bidarkar et al. |
| 9,332,050 | B2 | 5/2016 | Delahaye et al. |
| 9,369,513 | B2 | 6/2016 | Zhao et al. |
| 9,402,114 | B2 | 7/2016 | Gahm et al. |
| 2002/0154691 | A1 | 10/2002 | Kost et al. |
| 2009/0210300 | A1 | 8/2009 | Cansler et al. |
| 2012/0030723 | A1 | 2/2012 | Baum et al. |
| 2012/0192234 | A1* | 7/2012 | Britt ........................ H04N 5/782 725/58 |
| 2013/0242726 | A1 | 9/2013 | Vannithamby et al. |
| 2013/0266289 | A1 | 10/2013 | Oyman et al. |
| 2013/0329777 | A1 | 12/2013 | Konda et al. |
| 2014/0095670 | A1 | 4/2014 | Ozgur et al. |
| 2014/0219088 | A1 | 8/2014 | Oyman et al. |
| 2014/0241421 | A1 | 8/2014 | Orton-Jay et al. |
| 2014/0258456 | A1 | 9/2014 | Lee et al. |
| 2015/0271755 | A1* | 9/2015 | Karri ................. H04W 52/0229 370/252 |
| 2016/0088054 | A1 | 3/2016 | Hassan et al. |
| 2016/0192296 | A1 | 6/2016 | Rehan et al. |
| 2016/0234078 | A1* | 8/2016 | Jana ........................ H04L 67/02 |
| 2016/0316388 | A1 | 10/2016 | Rosen |
| 2017/0093942 | A1* | 3/2017 | Danielsson ............. H04L 49/90 |
| 2017/0149624 | A1* | 5/2017 | Chitti ...................... H04L 41/50 |
| 2018/0160332 | A1* | 6/2018 | Harris ..................... H04L 67/06 |
| 2018/0242191 | A1 | 8/2018 | Lundqvist et al. |
| 2020/0044988 | A1 | 2/2020 | Liu et al. |

FOREIGN PATENT DOCUMENTS

| | | |
|---|---|---|
| CA | 2673661 A1 | 7/2008 |
| CA | 2941701 | 9/2015 |
| WO | 2011047335 A1 | 4/2011 |
| WO | 2014001246 A1 | 1/2014 |
| WO | 2014160553 A1 | 10/2014 |
| WO | 2014177293 A1 | 11/2014 |
| WO | 2014209494 A1 | 12/2014 |

OTHER PUBLICATIONS

Borcoci, Eugen, "Content Distribution in Wireless/5G Environments.", University Politehnica Bucharest (UPB), Oct. 12, 2015, 1-87.

Fajardo, Jose O. et al., "Introducing mobile edge computing capabilities through distributed 5G cloud enabled small cells", Mobile networks and applications 21.4, 2016, 564-574.

Jiang, Junchen et al., "Improving fairness, efficiency, and stability in httpbased adaptive video streaming with festive", Proceedings of the 8th international conference on Emerging networking experiments and technologies. ACM, 2012, 97-108.

Maier, Martin et al., "The tactile internet: vision, recent progress, and open challenges", IEEE Communications Magazine 54.5, 2016, 138-145.

Maza, William David Diego, "A Framework for Generating HTTP Adaptive Streaming Traffic in ns3", SIMU Tools—9th EAI International Conference on Simulation Tools and Techniques, 2016, 1-7.

* cited by examiner

100

200

APPARATUS AND METHOD OF VIDEO STREAMING

FIELD OF THE DISCLOSURE

The subject disclosure relates to an apparatus and method of video streaming.

BACKGROUND

As the number of users of end user devices increases, the demand for communication services and network resources increases. This demand includes delivery of video content to various devices and various locations including fixed devices and mobile devices. A rapidly growing communication service is Over-the-top (OTT) video service which is presently dominating Internet traffic.

BRIEF DESCRIPTION OF THE DRAWINGS

Reference will now be made to the accompanying drawings, which are not necessarily drawn to scale, and wherein.

DETAILED DESCRIPTION

Figure 1:
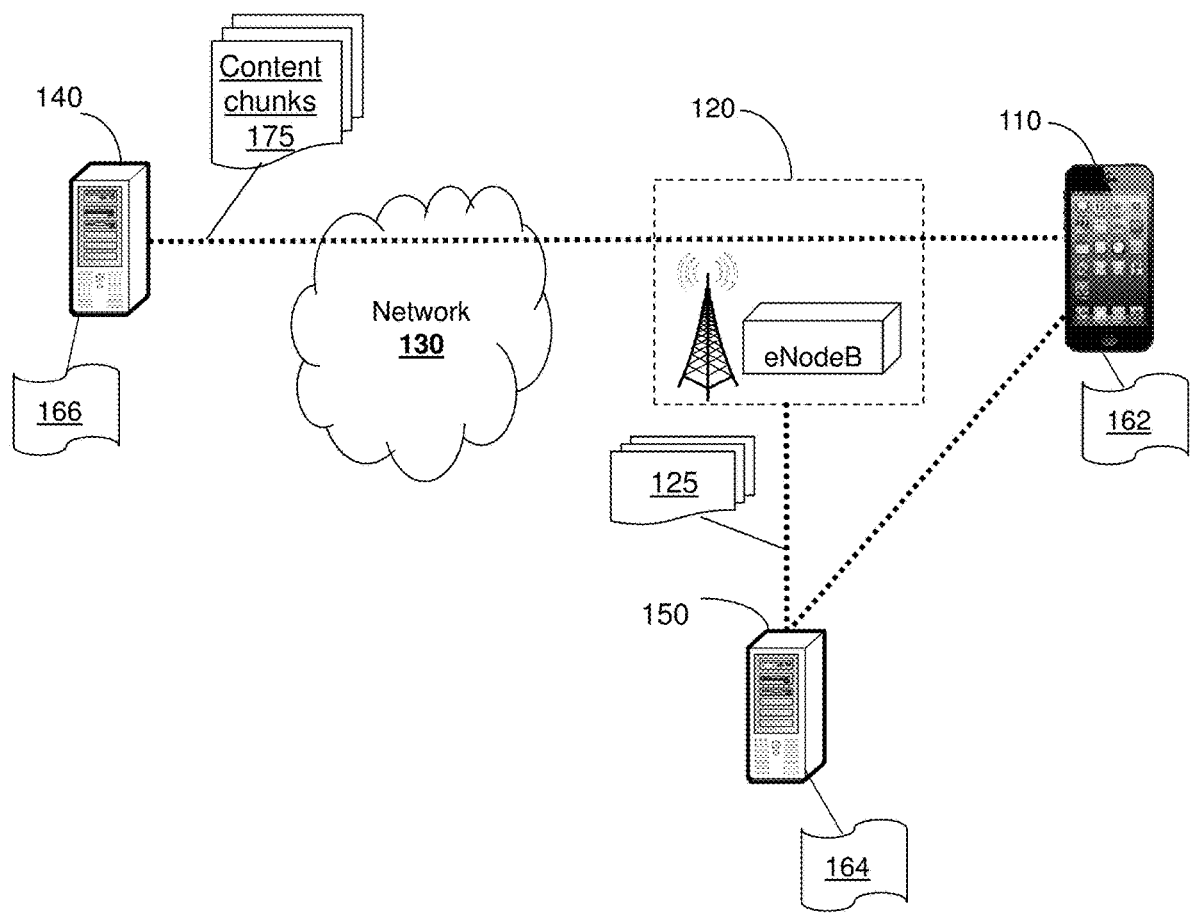
FIG. 1 depicts an illustrative embodiment of a system that provides Over-the-top video services based on predicted bandwidth.

The subject disclosure describes, among other things, illustrative embodiments for providing video streaming that is determined according to various factors which increase the efficiency of the streaming. In one or more embodiments, various information can be obtained to facilitate calculating or otherwise determining factors that are utilized in selecting criteria for video streaming, such as selecting a particular video chunk schedule or video bit rate for video streaming. This information can be updated and the video chunk schedule selection can be repeated throughout the video streaming to provide a dynamic process that accounts for changes in the network and/or end user device.

In one or more embodiments, Hypertext Transfer Protocol (HTTP) video streaming can be performed based on network parameters, such as Radio Access Network (RAN) parameters. As an example, an analytics server can collect network parameters, such as from an eNodeB and can determine an estimated bandwidth for a device(s) that will be receiving the HTTP video streaming. The network parameters can include various metrics such as signal quality metrics, cell load, and other information that affects the bandwidth of an end-user device.

In one or more embodiments, the estimated bandwidth can be provided by the analytics server to a video client of an end user device so that the video client can select a scheduling strategy (for obtaining video chunks) from among pre-determined strategies. A content server can then provide the video chunks according to the selected video chunk strategy. This process can be repeated throughout the streaming of the content to the particular end user device. Other factors can be utilized in determining the estimated bandwidth including historical information. Other factors can be utilized in selecting the scheduling strategy including a type of content (e.g., HD content vs. SD content).

In one or more embodiments, a data-driven RAN-aware approach can be applied to a dynamic selection of video bit rates during video streaming, where cell-level RAN information is collected by eNodeBs and can be utilized to predict available bandwidth for video streaming. In one embodiment, signal condition and/or cell load can be utilized in a regression analysis to predict bandwidth for video streaming. Additional components, steps, or features for monitoring a network and efficiently utilizing network resources during video services is described in U.S. application Ser. No. 15/475,717 filed on Mar. 31, 2017, entitled "Apparatus and Method of Managing Resources for Video Services", the contents of which is hereby incorporated by reference herein. These additional components, steps, or features described in the aforementioned application can be used in conjunction with or in place of components, steps, or features described with respect to the exemplary embodiments herein. Other embodiments are described in the subject disclosure.

One or more aspects of the subject disclosure is a method that includes obtaining, by a server comprising a processor, network parameter data from an eNodeB of a wireless network. The server can determine a predicted bandwidth for a group of end user devices in a coverage area of the eNodeB according to the network parameter data. The server can receive, from an end user device of the group of end user devices, a request for the predicted bandwidth. The server can provide the predicted bandwidth to the end user device. The providing of the predicted bandwidth can enable the end user device to select a chunk delivery schedule from a group of pre-determined chunk delivery schedules according to the predicted bandwidth and a buffer state of the end user device. The group of pre-determined chunk delivery schedules can utilize different video bitrates. The providing of the predicted bandwidth can enable the end user device to provide a video chunk request to a content server that is based on the chunk delivery schedule and can facilitate streaming of video content to the end user device from the content server.

One or more aspects of the subject disclosure include a machine-readable storage medium, comprising executable instructions that, when executed by a processing system including a processor of a wireless device, facilitate performance of operations. The operations can include determining an access request for video content. The operations can include providing, to a server, a request for a predicted bandwidth responsive to the access request. The operations can include receiving, from the server, the predicted bandwidth, where the predicted bandwidth is determined by the server according to network parameter data received by the server from an eNodeB, wherein the wireless device is operating in a coverage area of the eNodeB. The operations can include determining a buffer state of a buffer of the wireless device. The operations can include selecting a chunk delivery schedule from a group of pre-determined chunk delivery schedules according to the predicted bandwidth and the buffer state, where the group of pre-determined chunk delivery schedules utilize different video bitrates. The operations can include providing, to a content server, a video chunk request based on the chunk delivery schedule. The operations can include receiving, from the content server, video chunks of the video content responsive to the video chunk request.

One or more aspects of the subject disclosure include a server, comprising: a processing system including a processor; and a memory that stores executable instructions that, when executed by the processing system, facilitate performance of operations. The server can determine a predicted bandwidth associated with a coverage area of an eNodeB based on cell load information and received signal strength information that is calculated according to network parameter data collected by the eNodeB. The server can receive, from an end user device, a request for the predicted bandwidth. The server can provide the predicted bandwidth to the end user device, where the providing of the predicted bandwidth enables the end user device to select a chunk delivery schedule from a group of pre-determined chunk delivery schedules according to the predicted bandwidth and a buffer state of the end user device. The group of pre-determined chunk delivery schedules can utilize different video bitrates. The providing of the predicted bandwidth can enable the end user device to provide a video chunk request to a content server that is based on the chunk delivery schedule and can facilitate streaming of video content to the end user device from the content server.

FIG. 1 depicts an illustrative embodiment of a system 100 that allows for video streaming to an end user device 110. System 100 is applicable to any number of end user devices 110, although only one is illustrated. The end user device 110 can be various types of devices, including mobile devices (e.g., a mobile phone, a tablet, a laptop computer, a vehicle entertainment system, and so forth) and fixed devices (e.g., a set top box, a smart television, a desktop computer, and so forth). The end user device 110 can be subscribed to various communication services, such as voice, video, data and/or messaging.

In one or more embodiments, the end user device 110 can utilize OTT video services that provide video content over a network 130 (e.g., the Internet) such as from a content server 140. The OTT video services can be of various types, such as HTTP video (e.g., live streaming and/or Video-on-demand (VoD) services). In one or more embodiments, the video content can be encoded into multiple copies with different video bitrates. Each copy of encoded video content can be further segmented into video chunks (e.g., with each video chunk having a same duration of several seconds). In this example, for a specific duration of video content, multiple chunks (e.g., ranging from low video bitrate to high video bitrate) can be selected for transmission. In one embodiment, these video chunks can be published via HTTP services (e.g., via a Content Distribution Network (CDN) server).

In one or more embodiments, a video client 162 can be executed by the end user device 110 for providing a user with access to video content. The video client 162 can be various types of client applications, such as an application of a particular video content service provider. In another embodiment, the video client 162 can be of a communication service provider that accesses content from a particular content source (e.g., a third party source) and/or from its own network source(s).

As an example, the video client 162 can request video chunks based on HTTP protocol (e.g., sequentially). To increase the efficiency of the video streaming, the video client 162 can generate a video chunk request that is provided to the content server 140. The video chunk request can be generated by or otherwise selected by the video client 162 from among a group of pre-determined chunk delivery schedules, such as where these schedules have different video bitrates.

In one or more embodiments, the pre-determined chunk delivery schedules can be provisioned to the video client 162, such as by equipment of the service provider and/or equipment of the content provider. In one embodiment, the video client 162 can select a particular chunk delivery schedule based on a buffer state (e.g., percentage of buffer capacity being utilized, predicted buffer exhaustion, and other buffer parameters) of the buffer of the end user device 110 and/or based on a predicted bandwidth for the video streaming that will occur.

In one embodiment, the end user device 110 (e.g., the video client 162) can detect that a user is requesting OTT video service and can send a request for a predicted bandwidth to an analytics server 150. The analytics server 150 can be various types of computing devices that monitor or otherwise analyze network conditions and other network data in order to determine or otherwise predict bandwidth that will be available to one, some or all end user devices operating in a particular coverage area(s), such as of an eNodeB 120. In one embodiment, the analytics server 150 can be managed or otherwise operated by the service provider.

The analytics server 150 can receive or otherwise obtain network parameter data 125, such as from an eNodeB 120 of a wireless network. The analytics server 150 can then determine a predicted bandwidth for one, some or all end user devices in a coverage area(s) of the eNodeB 120 according to some or all of the network parameter data 125 utilizing function 164. The network parameter data 125 can be various types of information, including received signal strength data, cell load usage and/or capacity, network traffic, detected network failure(s), network resource usage, and so forth. In one embodiment, the analytics server 150 can apply regression analysis to some or all of the network parameter data 125, such as to determine received signal strength and/or cell load, and can then predict bandwidth, such as based on the received signal strength and/or cell load.

Other types of network parameter data can also be collected by the eNodeB, the end user device 110 and/or other devices (including network devices or customer devices), which can be provided to the analytics server 150, such as information indicative of channel condition degradation, multi-path fading, handover, cross-traffic, and so forth. In one embodiment, the network parameter data 125 which is collected or which is provided to the analytics server 150 can be associated with particular types of traffic or otherwise filtered, such as network parameter data 125 related only to video traffic. In another embodiment, the network parameter data 125 can be associated with all network traffic associated with the particular eNodeB 120. In another embodiment, the network parameter data 125 can be associated with particular type(s) of network traffic (e.g., video traffic and data traffic) and can exclude other particular type(s) of traffic (e.g., voice traffic and messaging traffic). In another embodiment, the collected network parameter data 125 can be associated with all network traffic and the analytics server 150 can designate a filtering process such that only parameter data associated with particular type(s) of traffic (e.g., video traffic and data traffic) is received by the analytics server.

In one embodiment, the eNodeB 120 can provide the network parameter data 125 to the analytics server 150 in real-time. In another embodiment, the eNodeB 120 can provide the network parameter data 125 to the analytics server 150 according to a monitoring schedule, which may or may not be a uniform schedule, such as the eNodeB 120 reporting network parameter data 125 during peak traffic hours and/or responsive to a detected network condition (e.g., when network traffic is above a traffic threshold.

In one embodiment, the eNodeB 120 can provide the network parameter data 125 to the analytics server 150 in response to a request from the analytics server or without such a request. In one embodiment, the analytics server 150 can request the particular type of network parameter data 125 that the eNodeB 120 is to provide to the analytics server. In one embodiment, the data type request sent from the analytics server 150 to the eNodeB 120 can cause the eNodeB to begin collecting that particular type of network parameter data 125. FIG. 1 depicts a single eNodeB 120 and a single analytics server 150, however, system 100 can have any number of eNodeBs and/or any number of analytic servers, which enable predicting bandwidth for video streaming by one, some or all end user devices in a coverage area(s).

In one or more embodiments, other information or factors can be utilized by the analytics server 150 for determining the predicted bandwidth and/or by the video client 162 for selecting the particular video chunk delivery schedule from among a group of pre-determined chunk delivery schedules, such as type or format of the video content (e.g., high definition content vs standard definition content), predicted changes to network conditions based on historical information, subscriber policy, quality of service agreements or thresholds, time of day, day of week, duration of video content, mobility (predicted or current) of the end user device 110, and so forth. In one embodiment, the analytics server 150 can determine different predicted bandwidths for a particular coverage area where the different predicted bandwidths are according to factors associated with the end user device. For example, two mobile phones that are in close proximity to each other can receive different predicted bandwidths due to different factors associated with the end user devices, such as different mobility (predicted or current), different capabilities of the end user devices, different policies per subscriber agreements, and so forth.

As an example, the predicted bandwidth can be used by the video client 162 to select a scheduling strategy among three scheduling strategies, such as a conservative strategy, a normal strategy, and an aggressive strategy. In this example and further depending on the buffer state, when the predicted bandwidth is high, the video client 162 can select the aggressive strategy with a higher video bitrate; when the predicted bandwidth is low, the video client can select the conservative strategy with a lower video bitrate; and when the predicted bandwidth is normal, the video client can select the normal strategy. This example describes three different strategies having three different video bitrates, however, any number of different strategies can be utilized. In one embodiment, the predicted bandwidth is not directly used to map the video bitrate. The chunk strategies can cover a range of predicted bandwidths and can be further selected based on other factors such as the buffer state of the end user device. The exemplary process described herein can have a two-level control, i.e., predicted bandwidth controls the scheduling strategy, and scheduling strategy controls actual video chunk scheduling. This makes the exemplary process more reliable to tolerate less accurate bandwidth prediction in case the network becomes too dynamic and causes difficulty in prediction analysis.

The video client 162 can send the video chunk request to the content server 140 and then the content server can serve such requests according to function 166. After receiving the video chunks 175, the video client 162 can present the corresponding portion of the video content. Throughout the video streaming, this process can be repeated so that the video streaming is being efficiently performed. As an example, the video client 162 can repeatedly receive updated predicted bandwidths which are being repeatedly determined by the analytics server 150 based on updated network parameter data 125 that is repeatedly being provided by the eNodeB 120 to the analytics server 150. How frequently this process is repeated and whether or not the interval of repetition is uniform can vary according to a number of factors, such as currently or predicted changing network conditions, end user device resource usage (e.g., size of buffer), type or format of the video content, and so forth.

In one or more embodiments, the repeated determination of the predicted bandwidth by the analytics server 150 can be performed independent of any request from the end user device 110. For example, the analytics servers 150 can repeatedly receive network parameter data 125 and based thereon can keep updating the predicted bandwidth. If the analytics server 150 receives a request for the predicted bandwidth then the predicted bandwidth can be provided to the requesting device, such as end user device 110 seeking video streaming. In one embodiment, the end user device 110 transmits a request for predicted bandwidth to the analytics server 150 each time it desires to receive an updated predicted bandwidth, throughout the duration of the video streaming of the same video content. In another embodiment, the end user device 110 can transmit an initial request for predicted bandwidth to the analytics server 150 and can further receive updated predicted bandwidth throughout the duration of the video streaming of the same video content (without the client device 162 transmitting additional requests), such as until the video client 162 notifies the analytics server 150 that it no longer is requesting the updated predicted bandwidth.

System 100 allows implementation of a data-driven method to simultaneously accurately estimate or otherwise predict available bandwidth for an end user device 110 and apply the estimated or predicted bandwidth efficiently on video chunk scheduling. RAN condition dynamics of a mobility network can be a major contributor of end-to-end network dynamics for HTTP video streaming System 100 can utilize RAN awareness to enable an accurate estimation or prediction on available bandwidth for an end user device. As an example, eNodeBs in an LTE network can have rich RAN information. System 100 makes it feasible to obtain such information for real-time analytics.

Figure 2:
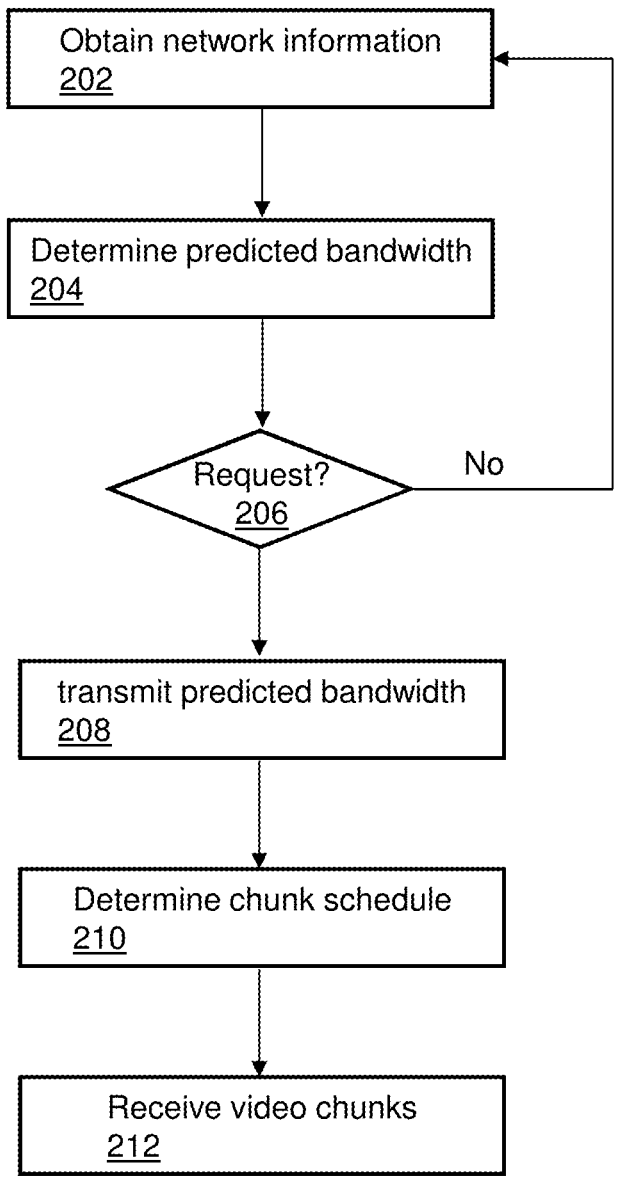
FIG. 2 depicts an illustrative embodiment of a method used in portions of the system described in FIG. 1.

FIG. 2 depicts an illustrative embodiment of a method 200 for managing video streaming, including determining video chunk delivery to a video client of an end user device. Method 200 describes functions being performed by network element(s) (e.g., analytics server 150) and functions being performed by user device(s) (e.g., video client 162 of end user device 110). However, various devices can perform one, some or all of the functions described with respect to method 200 and the various devices can be service provider(s) devices and/or user device(s).

At 202, information can be collected or otherwise obtained that is utilized in determining a predicted bandwidth. In one embodiment, the predicted bandwidth can be determined for a particular end user device, such as a device whose parameters are known (e.g., one or more of location, operational functionality, mobility, and so forth). In another embodiment, the predicted bandwidth can be determined for a group of end user devices, such as devices whose parameters are known, are partially known, or are unknown. In one embodiment, the group of end user devices can be devices that are located in a particular service coverage area, such as associated with a particular eNodeB.

The information collected at 202 can be of various types and can be collected by various devices based on various timing processes. As an example, an eNodeB can collect data associated with signal quality and/or cell load, such as Received Signal Strength Indicator (RSSI) measurements, Channel Quality Indicator (CQI) data, Physical Resource Block (PRB) usage, PRB capacity, and so forth. The eNodeB can collect the data under various time constraints, such as continuously collecting the data, collecting the data at uniform intervals, and/or collecting the data at non-uniform intervals (e.g., employing shorter intervals during peak traffic or in response to a triggering event such as a network detected failure and employing longer intervals during non-peak traffic).

In one embodiment, the collected information can be provided to a server (e.g., analytics server 150) so that the server can determine a predicted bandwidth at 204. For example, the collected information can be supplied by the source(s) (e.g., eNodeB(s) under various time constraints, such as continuously transmitting collected data, transmitting the collected data at uniform intervals, and/or transmitting the collected data at non-uniform intervals (e.g., employing shorter intervals during peak traffic or in response to a triggering event such as a network detected failure and employing longer intervals during non-peak traffic). In one embodiment, the analytics server 150 can determine a predicted bandwidth for a group of end user devices in a coverage area of the eNodeB according to the data received from the eNodeB. In another embodiment, the analytics server 150 can determine the predicted bandwidth for the group of end user devices in the coverage area of the eNodeB according to the data received from the eNodeB and according to other information, such as network data received from other network devices (e.g., a performance monitoring device in a network core) and/or information received from end user device(s) (e.g., RSSI and CQI data from the end user device requesting video streaming and/or an end user device that is currently receiving video streaming in the coverage area of the eNodeB).

In one embodiment, the obtaining of collected data and the determining of a predicted bandwidth according to the collected data can be a process that is repeated, such as at a pre-determined frequency. In one embodiment, the obtaining of collected data and the determining of a predicted bandwidth according to the collected data can be a process that is performed independently of end user devices initiating video streaming services. For example, the analytics server 150 can recalculate predicted bandwidths at pre-determined or dynamic intervals based on collected data being received (continuously or otherwise) regardless of whether any end user devices are initiating or utilizing video streaming services. In one embodiment, the recalculation of a predicted bandwidth can be triggered by receiving a threshold amount of data from the eNodeB.

At 206, the analytics server 150 monitors for requests for the predicted bandwidth. The server can continue obtaining network information and updating the predicted bandwidths as shown in method 200. As an example, a request for the predicted bandwidth can be received from an end user device in a particular coverage area for which a predicted bandwidth has been determined. In another embodiment, the request can be received from another device, such as a network element that has detected that the video client 162 is requesting access to OTT services. In one embodiment, the video client 162 can request access to OTT services utilizing a first chunk request and that first chunk request can be adjusted by the network element or the content server according to the predicted bandwidth.

At 208, in response to the request, the analytics server 150 can provide the predicted bandwidth to the end user device. At 210, the end user device can select a chunk delivery schedule (e.g., a particular video bit rate) from a group of pre-determined chunk delivery schedules according to the predicted bandwidth and/or according to other factors. For example, the other factors utilized by the end user device for selecting the particular video chunk schedule can include a buffer state of the end user device, such as buffer capacity, present buffer usage, predicted buffer exhaustion, and so forth. In one embodiment, each of the group of pre-determined chunk delivery schedules utilizes a different video bitrate. At 212, the end user device can provide a video chunk request to a content server that is based on the chunk delivery schedule and the content server can respond to the request by providing the video chunks requested which enables streaming of the video content to the end user device from the content server.

In one or more embodiments, the end user device can select a video rate based on the received predicted bandwidth which may or may not also be based on one or more other factors known to or otherwise determined by the end user device, such as the buffer state, mobility trajectory information, end user device resources/applications in use (e.g., presently in a voice communication session), calendar data indicating end user device resources/applications that will be used, user preferences, history of buffer errors or delays (e.g., per type of content, time of day, length of content, and so forth)). In one embodiment, the end user device selects a particular video rate from among a group of pre-determined video rates, where each of the video rates is associated with a range of predicted bandwidths and not mapped directly to the predicted bandwidth.

In one embodiment, the analytics server 150 can provide a recommendation for the video rate/chunk schedule. For example, the analytics server 150 can transmit the predicted bandwidth (e.g., a low predicted bandwidth) and can further transmit a recommendation to select the conservative video chunk strategy that has a low video bitrate. In this example, the end user device can receive the predicted bandwidth and the recommendation to select the conservative video chunk strategy. However, the end user device can determine whether to follow the recommendation of to select a different video chunk strategy. For instance, the video client 162 can determine that other factors, such as the buffer state, format of the video (e.g., standard definition), and/or user preference that allows lower quality video, can be taken into account and result in a selection of the normal video chunk strategy.

In one or more embodiments, the end user device can share the predicted bandwidth with other devices (e.g., other end user devices) that do not have access to the analytics server 150. For example, the end user device 110 can be receiving video streaming according to the method 200 based on a subscriber agreement with a service provider that operates the analytics server 150. A second end user device, which does not have access to the analytics server 150, can receive the predicted bandwidth, which is forwarded to the second end user device by the first end user device. For example, the forwarding of the predicted bandwidth by the first end user device to the second end user device can be based on a request sent from the second end user device to the first end user device. In one embodiment, the first and second end user devices can be associated with each other, such as the respective users being family or friends.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
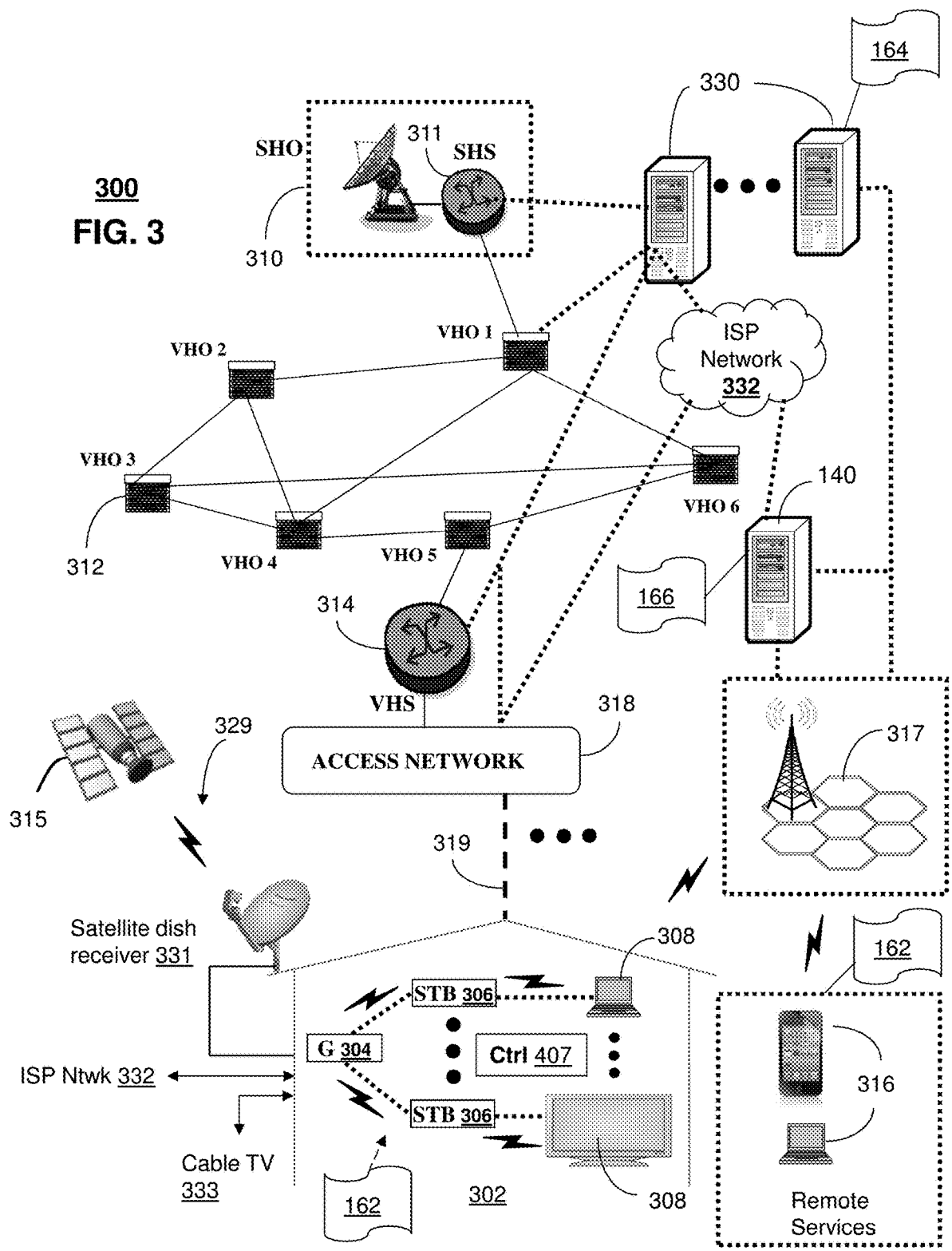
FIG. 3 depicts an illustrative embodiment of a communication system that provides media services including Over-the-top video services that is based on predicted bandwidth.

FIG. 3 depicts an illustrative embodiment of a communication system 300 for providing various communication services, such as delivering OTT services to end user devices. The communication system 300 can represent an interactive media network, such as an interactive television system (e.g., an Internet Protocol Television (IPTV) media system). Communication system 300 can be overlaid or operably coupled with system 100 of FIG. 1 as another representative embodiment of communication system 300. For instance, one or more devices illustrated in the communication system 300 of FIG. 3 can perform one or more of the following: RAN-aware analytics server(s) receiving real-time RAN information from eNodeB(s); RAN-aware analytics server(s) predicting available bandwidth for subscribed end user device(s) based on the RAN information; video clients on the end user device(s) submitting recommendation requests to the RAN-aware analytics server(s); RAN-aware analytics server(s) accordingly responding to the video client(s) with the predicted bandwidth; based on the received predicted estimated bandwidth and/or other information (e.g., buffer state), video client(s) determining which video chunks to request; video client(s) sending the corresponding chunk requests to the content server (e.g., an HTTP video server); the HTTP video server serving the received chunk requests accordingly; and after receiving the corresponding video chunks, the video client(s) presenting the video content via the OTT service.

The OTT services described above can be provided in system 300 in conjunction with or in place of other communication services. For example, the communication system 300 can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol. The VHS 314 can distribute multimedia broadcast content via an access network 318 to commercial and/or residential buildings 302 housing a gateway 304 (such as a residential or commercial gateway).

The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system. In one or more embodiments, the OTT services can be implemented in place of delivery of the video content via a different access path, such as instead of via access network 318, satellite broadcast television system 329, a hardwire connection to ISP network 332, cable TV system 333 or some other non-OTT service. As an example, the OTT service can be delivered to a set top box 306 that has a transceiver, where it is detected that there is an undesired condition associated with the access network 318 or signal quality associated with a signal being received via the satellite broadcast television system 329 does not satisfy a quality threshold.

In another embodiment, the OTT services can be implemented in addition to delivery of the video content via a different access path, such as in addition to access network 318, satellite broadcast television system 329, a hardwire connection to ISP network 332, cable TV system 333 or some other non-OTT service. As an example, the OTT service can be delivered to a first set top box 306 (or other device in the premises 302) that has a transceiver, where it is detected that other devices (e.g., set top boxes 306) in the premises are all in operation and/or are utilizing a large amount of bandwidth on the particular non-OTT path.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as an analytics server (herein referred to as server 330). The server 330 can use computing and communication technology to perform function 164 as described with respect to system 100 of FIG. 1 and method 200 of FIG. 2, which can include among other things, one or more of: determining a predicted bandwidth associated with a coverage area of an eNodeB (e.g., based on cell load information and received signal strength information) that is calculated according to network parameter data (e.g., collected by the eNodeB; receiving, from an end user device, a request for the predicted bandwidth; providing the predicted bandwidth to the end user device, where the providing of the predicted bandwidth enables the end user device to select a chunk delivery schedule from a group of pre-determined chunk delivery schedules according to the predicted bandwidth and/or other information (e.g., a buffer state of the end user device), where the group of pre-determined chunk delivery schedules utilize different video bitrates, and where the providing of the predicted bandwidth enables the end user device to provide a video chunk request to a content server that is based on the chunk delivery schedule and facilitates streaming of video content to the end user device from the content server; and determining the predicted bandwidth based on regression analysis. Function 164 can further include one or more of: obtaining updated network parameter data from the eNodeB; determining an updated predicted bandwidth for the coverage area of the eNodeB according to the updated network parameter data; providing the updated predicted bandwidth to the end user device, where the providing of the updated predicted bandwidth enables the end user device to select an updated chunk delivery schedule from the group of pre-determined chunk delivery schedules according to the updated predicted bandwidth; receiving, from the end user device, an updated request for the predicted bandwidth, where the providing the updated predicted bandwidth to the end user device is responsive to the updated request; and determining the predicted bandwidth prior to receiving the request for the predicted bandwidth from the end user device.

In one or more embodiments, the media processors 306 and/or wireless communication devices 316 can be provisioned with software function 162 to utilize the predicted bandwidth services of server 330. For instance, function 162 of media processors 306 and wireless communication devices 316 can be similar to the functions described for end user device 110 of FIG. 1 and/or in accordance with method 200.

Multiple forms of media services can be offered to media devices over landline technologies such as those described above. Additionally, media services can be offered to media devices by way of a wireless access base station and/or eNodeB 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. The eNodeB can collect various network performance data and provide the network performance data to the server 330 for determination of the predicted bandwidth. In one embodiment, the server 330 has access to real-time performance data being collected by the ENodeB.

In one or more embodiments, the OTT services provided to the media processors 306 can be implemented as a back-up technique to the normal content delivery. For example, the gateway 304 or another device at the premises 302 can detect that there is an undesired condition associated with the normal delivery path (e.g., via access network 318, satellite broadcast television system 329, a hardwire connection to ISP network 332, or cable TV system 333) and can establish OTT services via the base station 317, the server 330 and the content server 140. In this example, removal of the undesired condition (e.g., detected by the gateway 304) can trigger switching back to the normal content delivery technique.

One or more of the exemplary embodiments can enable predicted bandwidths to be utilized by a communication service provider for increasing efficiency in video streaming of video content services in mobility networks of the communication service provider and can also enable predicted bandwidths to be utilized as an Internet service that serves other OTT video service providers, such as third party content providers. For example, a communication service provider can collect network performance parameters and determine a predicted bandwidth, and allow a third party provider access to the predicted bandwidth.

Figure 4:
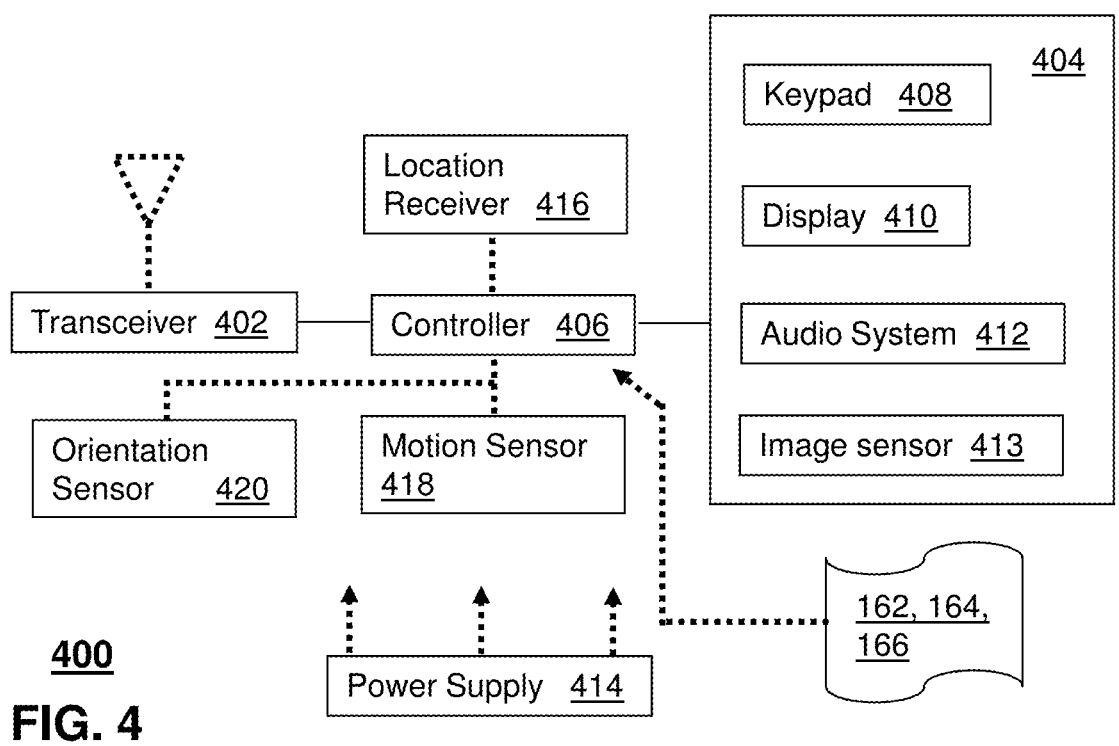
FIG. 4 depicts an illustrative embodiment of a communication device that can be utilized with providing Over-the-top video services based on predicted bandwidth.

FIG. 4 depicts an illustrative embodiment of a communication device 400. Communication device 400 can serve in whole or in part as an illustrative embodiment of the devices depicted in systems 100 and 300 of FIGS. 1 and 3, and can be configured to perform portions of method 200 of FIG. 2. As an example, communication device 400 can perform one or more of the following: determining an access request for video content; responsive to the access request, providing, to a server, a request for a predicted bandwidth; receiving, from the server, the predicted bandwidth, where the predicted bandwidth is determined by the server according to network parameter data received by the server from an eNodeB, and where the mobile device is operating in a coverage area of the eNodeB; determining a buffer state of a buffer of the mobile device; selecting a chunk delivery schedule from a group of pre-determined chunk delivery schedules according to the predicted bandwidth and the buffer state, where the group of pre-determined chunk delivery schedules utilize different video bitrates; providing, to a content server, a video chunk request based on the chunk delivery schedule; and receiving, from the content server, video chunks of the video content responsive to the video chunk request. In one or more embodiments, communication device 400 can perform one or more of the following: receiving, from the server, an updated predicted bandwidth, where the updated predicted bandwidth is determined by the server according to updated network parameter data received by the server from the eNodeB; selecting an updated chunk delivery schedule from the group of pre-determined chunk delivery schedules according to the updated predicted bandwidth; providing, to the content server, an updated video chunk request based on the updated chunk delivery schedule; receiving, from the content server, additional video chunks of the video content responsive to the updated video chunk request; determining an updated buffer state of the buffer, where the selecting the updated chunk delivery schedule from the group of pre-determined chunk delivery schedules is based in part on the updated buffer state; and providing, to the server, an updated request for the predicted bandwidth, where the receiving the updated predicted bandwidth from the server is responsive to the updated request for the predicted bandwidth.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of the devices of systems 100 and 300 of FIGS. 1 and 3. It will be appreciated that the communication device 400 can also represent other devices that can operate in systems 100 and 300 such as a gaming console and a media player. In addition, the controller 406 can be adapted in various embodiments to perform the functions 162, 164, and/or 166.

Upon reviewing the aforementioned embodiments, it would be evident to an artisan with ordinary skill in the art that said embodiments can be modified, reduced, or enhanced without departing from the scope of the claims described below. For example, the video client can attempt to adapt to network dynamics and obtain the best video experience by receiving the predicted bandwidth, measure network conditions, and determining buffer status, and then selecting the video chunk (from multiple copies) that fits these factors best, such as based on a video chunk scheduling algorithm. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
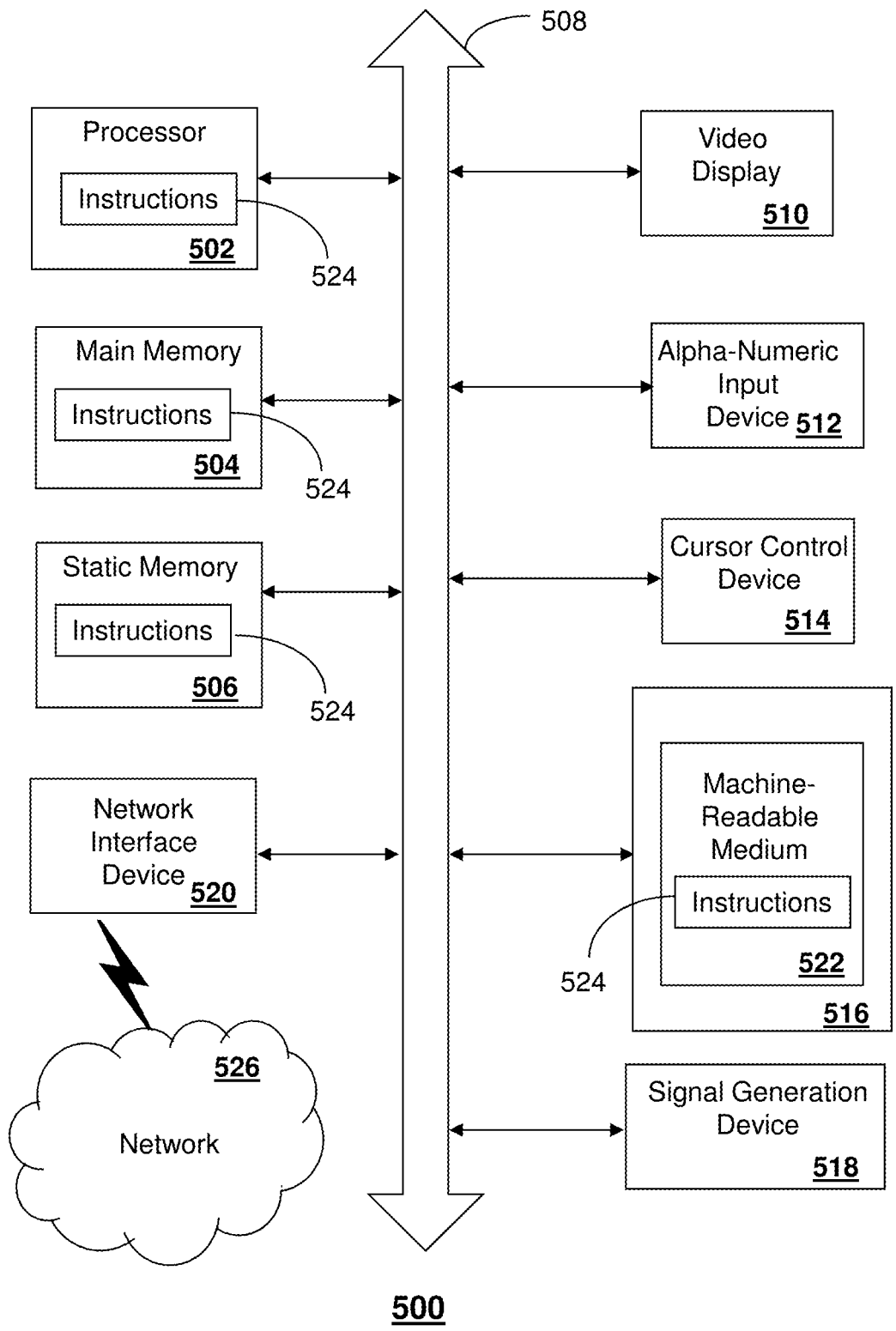
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. As an example, computer system 500 can collect network parameter data, such as RAN performance data; can determine a predicted bandwidth based on the collected data; and/or can select a video chunk delivery strategy based at least in part on the predicted bandwidth. One or more instances of the machine can operate, for example, as the end user device 110, the eNodeB 120, the content server 140, the analytics server 150, the server 330, the media processor 306, the mobile device 316 and other devices of FIGS. 1, 3 and 4. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
obtaining, by a server comprising a processor, network parameter data from an eNodeB of a wireless network, wherein the network parameter data includes a detected network failure, channel condition degradation, multi-path fading, handover, and cross-traffic;
determining, by the server and according to the network parameter data, a predicted bandwidth for a group of end user devices in a coverage area of the eNodeB;
receiving, by the server from an end user device of the group of end user devices, a request for the predicted bandwidth responsive to an access request for video content by the end user device; and
providing, by the server, the predicted bandwidth to the end user device, wherein the providing of the predicted bandwidth enables the end user device to select a chunk delivery schedule from a group of pre-determined chunk delivery schedules according to the predicted bandwidth, a buffer state of the end user device, mobility trajectory information, identification of a first end user device application corresponding to a voice communication session presently in use at the end user device, and calendar data indicating a second end user device application that will be used at the end user device, wherein the group of pre-determined chunk delivery schedules utilize different video bitrates, wherein the providing of the predicted bandwidth enables the end user device to provide a video chunk request to a content server that is based on the chunk delivery schedule and facilitates streaming of the video content to the end user device from the content server, and wherein the buffer state comprises a percentage of buffer capacity of a buffer being utilized, predicted buffer exhaustion of the buffer, a size of the buffer, and a history of buffer errors or delays.

2. The method of claim 1, wherein the determining the predicted bandwidth according to the network parameter data comprises determining a cell load associated with the eNodeB.

3. The method of claim 2, wherein the network parameter data comprises received signal strength data.

4. The method of claim 1, wherein the determining the predicted bandwidth according to the network parameter data is based on regression analysis.

5. The method of claim 1, comprising:
obtaining, by the server, updated network parameter data from the eNodeB;
determining, by the server, an updated predicted bandwidth for the group of end user devices in the coverage area of the eNodeB according to the updated network parameter data;
receiving, by the server from the end user device, an updated request for the predicted bandwidth; and
providing, by the server, the updated predicted bandwidth to the end user device responsive to the updated request, wherein the providing of the updated predicted bandwidth enables the end user device to select an updated chunk delivery schedule from the group of pre-determined chunk delivery schedules according to the updated predicted bandwidth.

6. The method of claim 1, wherein the determining the predicted bandwidth occurs prior to the server receiving the request for the predicted bandwidth from the end user device.

7. The method of claim 1, further comprising:
filtering, by the server, the network parameter data in accordance with an identification of particular types of traffic to obtain filtered network parameter data,
wherein the determining of the predicted bandwidth is according to the filtered network parameter data.

8. The method of claim 1, wherein the determining of the predicted bandwidth is further in accordance with a type or format of the video content in terms of a definition of the video content, a subscriber policy, a quality of service agreement or threshold, a time of day, a day of week, and a duration of the video content.

9. A non-transitory machine-readable storage medium, comprising executable instructions that, when executed by a processing system including a processor of a wireless device, facilitate performance of operations, the operations comprising:
determining an access request for video content;
responsive to the access request, providing, to a server, a request for a predicted bandwidth;
receiving, from the server, the predicted bandwidth, wherein the predicted bandwidth is determined by the server according to network parameter data received by the server from an eNodeB, wherein the wireless device is operating in a coverage area of the eNodeB, and wherein the network parameter data includes a detected network failure, channel condition degradation, multi-path fading, handover, and cross-traffic;
determining a buffer state of a buffer of the wireless device, wherein the buffer state comprises a percentage of buffer capacity of a buffer being utilized, predicted buffer exhaustion of the buffer, a size of the buffer, and a history of buffer errors or delays;
selecting a chunk delivery schedule from a group of pre-determined chunk delivery schedules according to the predicted bandwidth, the buffer state, mobility trajectory information, identification of a first application presently corresponding to a voice communication session in use at the wireless device, and calendar data indicating a second application that will be used at the wireless device, wherein the group of pre-determined chunk delivery schedules utilize different video bitrates;
providing, to a content server, a video chunk request based on the chunk delivery schedule; and
receiving, from the content server, video chunks of the video content responsive to the video chunk request.

10. The non-transitory machine-readable storage medium of claim 9, wherein the predicted bandwidth is determined by the server based on a cell load and received signal strength.

11. The non-transitory machine-readable storage medium of claim 9, wherein the predicted bandwidth is determined by the server prior to the providing the request for the predicted bandwidth to the server.

12. The non-transitory machine-readable storage medium of claim 9, wherein the group of pre-determined chunk delivery schedules are not directly mapped to the predicted bandwidth.

13. The non-transitory machine-readable storage medium of claim 9, wherein the operations further comprise:
receiving, from the server, an updated predicted bandwidth, wherein the updated predicted bandwidth is determined by the server according to updated network parameter data received by the server from the eNodeB;

selecting an updated chunk delivery schedule from the group of pre-determined chunk delivery schedules according to the updated predicted bandwidth;

providing, to the content server, an updated video chunk request based on the updated chunk delivery schedule; and receiving, from the content server, additional video chunks of the video content responsive to the updated video chunk request.

14. The non-transitory machine-readable storage medium of claim 13, wherein the operations further comprise:

determining an updated buffer state of the buffer, wherein the selecting the updated chunk delivery schedule from the group of pre-determined chunk delivery schedules is based in part on the updated buffer state.

15. The non-transitory machine-readable storage medium of claim 13, wherein the operations further comprise:

providing, to the server, an updated request for the predicted bandwidth, wherein the receiving the updated predicted bandwidth from the server is responsive to the updated request for the predicted bandwidth.

16. The non-transitory machine-readable storage medium of claim 9, wherein the predicted bandwidth is determined by the server according to network parameter data utilizing regression analysis.

17. A server, comprising:

a processing system including a processor; and a memory that stores executable instructions that, when executed by the processing system, facilitate performance of operations, the operations comprising:

determining a predicted bandwidth associated with a coverage area of an eNodeB according to network parameter data collected by the eNodeB, wherein the network parameter data includes cell load information, received signal strength information, a detected network failure, channel condition degradation, multi-path fading, handover, and cross-traffic;

receiving, from an end user device, a request for the predicted bandwidth responsive to an access request for video content by the end user device; and providing the predicted bandwidth to the end user device, wherein the providing of the predicted bandwidth enables the end user device to select a chunk delivery schedule from a group of pre-determined chunk delivery schedules according to the predicted bandwidth, a buffer state of the end user device, mobility trajectory information, identification of a first application corresponding to a voice communication session presently in use at the end user device, and calendar data indicating a second application that will be used at the end user device, wherein the group of pre-determined chunk delivery schedules utilize different video bitrates, wherein the providing of the predicted bandwidth enables the end user device to provide a video chunk request to a content server that is based on the chunk delivery schedule and facilitates streaming of the video content to the end user device from the content server, and wherein the buffer state comprises a percentage of buffer capacity of a buffer being utilized, predicted buffer exhaustion of the buffer, a size of the buffer, and a history of buffer errors or delays.

18. The server of claim 17, wherein the determining the predicted bandwidth is based on regression analysis.

19. The server of claim 17, wherein the operations further comprise:

obtaining updated network parameter data from the eNodeB;

determining an updated predicted bandwidth for the coverage area of the eNodeB according to the updated network parameter data;

receiving, from the end user device, an updated request for the predicted bandwidth; and providing the updated predicted bandwidth to the end user device responsive to the updated request, wherein the providing of the updated predicted bandwidth enables the end user device to select an updated chunk delivery schedule from the group of pre-determined chunk delivery schedules according to the updated predicted bandwidth.

20. The server of claim 17, wherein the determining the predicted bandwidth occurs prior to the server receiving the request for the predicted bandwidth from the end user device.

* * * * *